United States Patent
Perlo et al.

(10) Patent No.: US 9,919,619 B2
(45) Date of Patent: Mar. 20, 2018

(54) MOTOR-VEHICLE FRAME

(71) Applicants: Poli-Model S.R.L., Moncalieri (TO) (IT); Interactive Fully Electrical Vehicles S.R.L., Sommariva del Bosco (CN) (IT)

(72) Inventors: Pietro Perlo, Rivoli (IT); Pietro Guerrieri, Rivoli (IT)

(73) Assignees: Poli-Model S.R.L., Moncalieri (TO) (IT); Interactive Fully Electrical Vehicles S.R.L., Sommariva del Bosco (CN) (IT)

( * ) Notice: Subject to any disclaimer, the term of this patent is extended or adjusted under 35 U.S.C. 154(b) by 0 days.

(21) Appl. No.: 14/912,533

(22) PCT Filed: Apr. 8, 2015

(86) PCT No.: PCT/IB2015/052531
§ 371 (c)(1),
(2) Date: Feb. 17, 2016

(87) PCT Pub. No.: WO2015/155697
PCT Pub. Date: Oct. 15, 2015

(65) Prior Publication Data
US 2016/0200221 A1 Jul. 14, 2016

(30) Foreign Application Priority Data
Apr. 11, 2014 (IT) .............................. TO2014A0312

(51) Int. Cl.
*B60N 2/015* (2006.01)
*B62D 23/00* (2006.01)
(Continued)

(52) U.S. Cl.
CPC .......... *B60N 2/015* (2013.01); *B62D 23/005* (2013.01); *B62D 25/2036* (2013.01); *B62D 25/2045* (2013.01); *B62D 31/003* (2013.01)

(58) Field of Classification Search
CPC .... B60N 2/015; B62D 31/003; B62D 23/005; B62D 25/2036; B62D 25/2045
(Continued)

(56) References Cited

U.S. PATENT DOCUMENTS

| 4,217,970 A | 8/1980 | Chika |
| 2011/0241379 A1* | 10/2011 | Obe ................... B60H 1/00378 296/190.09 |

(Continued)

FOREIGN PATENT DOCUMENTS

| EP | 2 263 930 A2 | 12/2010 |
| GB | 2 458 956 A | 10/2009 |
| WO | 2010/111553 A1 | 9/2010 |

OTHER PUBLICATIONS

International Search Report dated Jul. 8, 2015, issued in PCT Application No. PCT/IB2015/052531, filed Apr. 8, 2015.

*Primary Examiner* — Joseph D. Pape
*Assistant Examiner* — Dana D Ivey
(74) *Attorney, Agent, or Firm* — Workman Nydegger

(57) ABSTRACT

A motor-vehicle frame includes a pair of longitudinal members; a plurality of cross members, which join the longitudinal members to one another; a resting surface, which is supported by the longitudinal members and cross members and defines the surface of the floor of the passenger compartment of the motor vehicle; a pair of front uprights; and a front-seat assembly. The frame includes a platform structure, arranged on which is the front-seat assembly, which
(Continued)

affords a greater comfort within the passenger compartment and moreover strengthens the overall structure of the motor vehicle.

14 Claims, 15 Drawing Sheets

(51) Int. Cl.
    *B62D 25/20*     (2006.01)
    *B62D 31/00*     (2006.01)

(58) Field of Classification Search
    USPC .................................................. 296/203.01
    See application file for complete search history.

(56) References Cited

U.S. PATENT DOCUMENTS

2012/0031688 A1*   2/2012   Safranski ................ B60G 3/14
                                                                 180/54.1
2013/0187407 A1     7/2013   Hufnagl \* cited by examiner

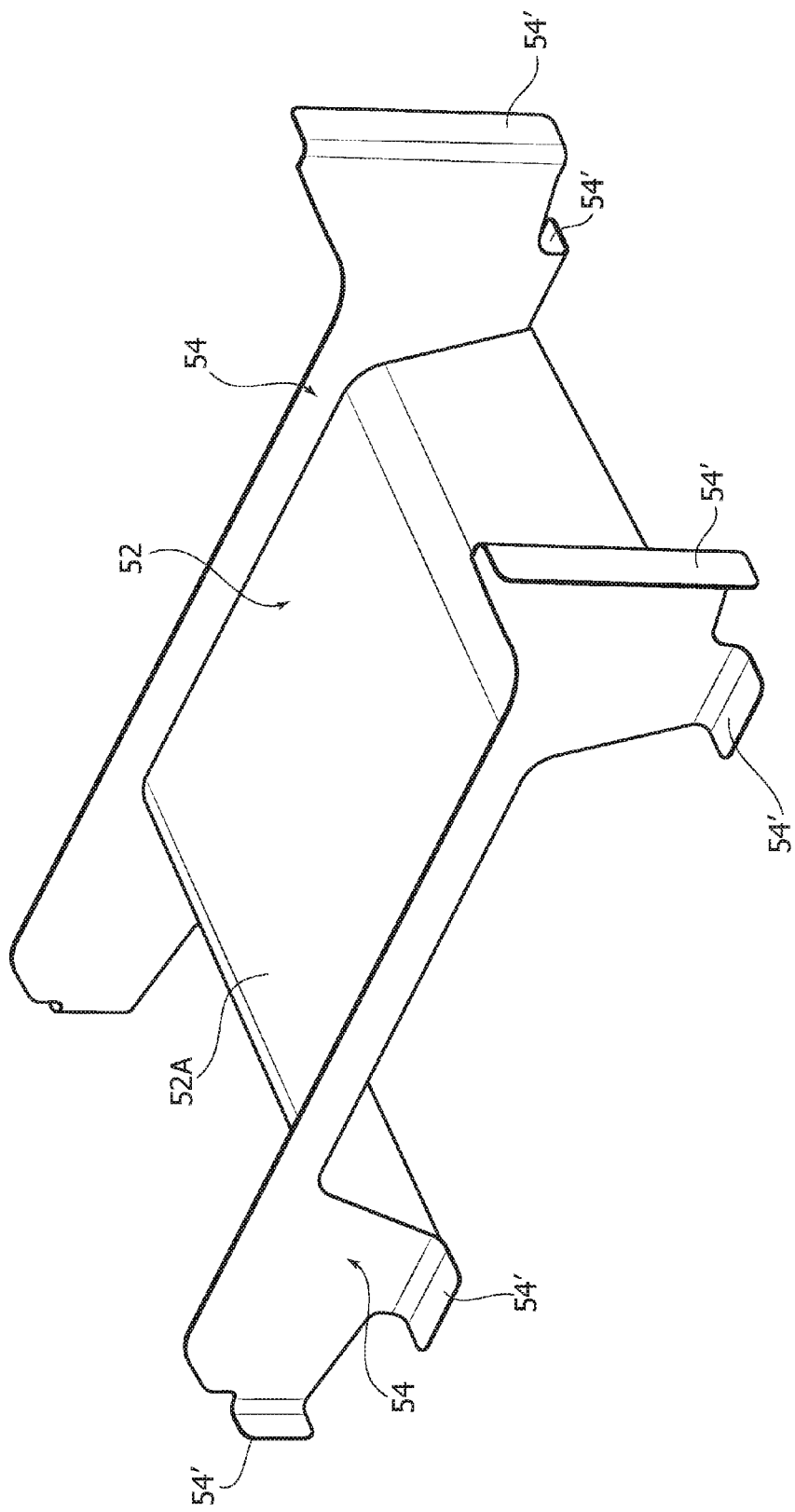

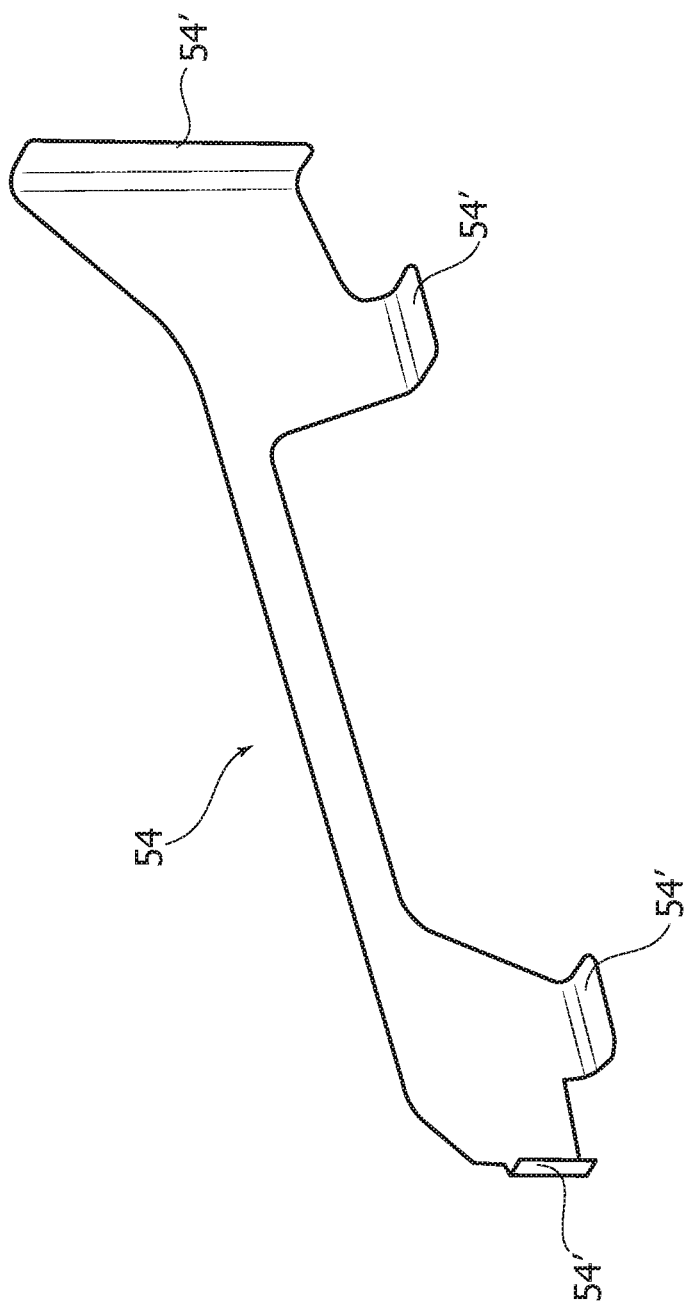

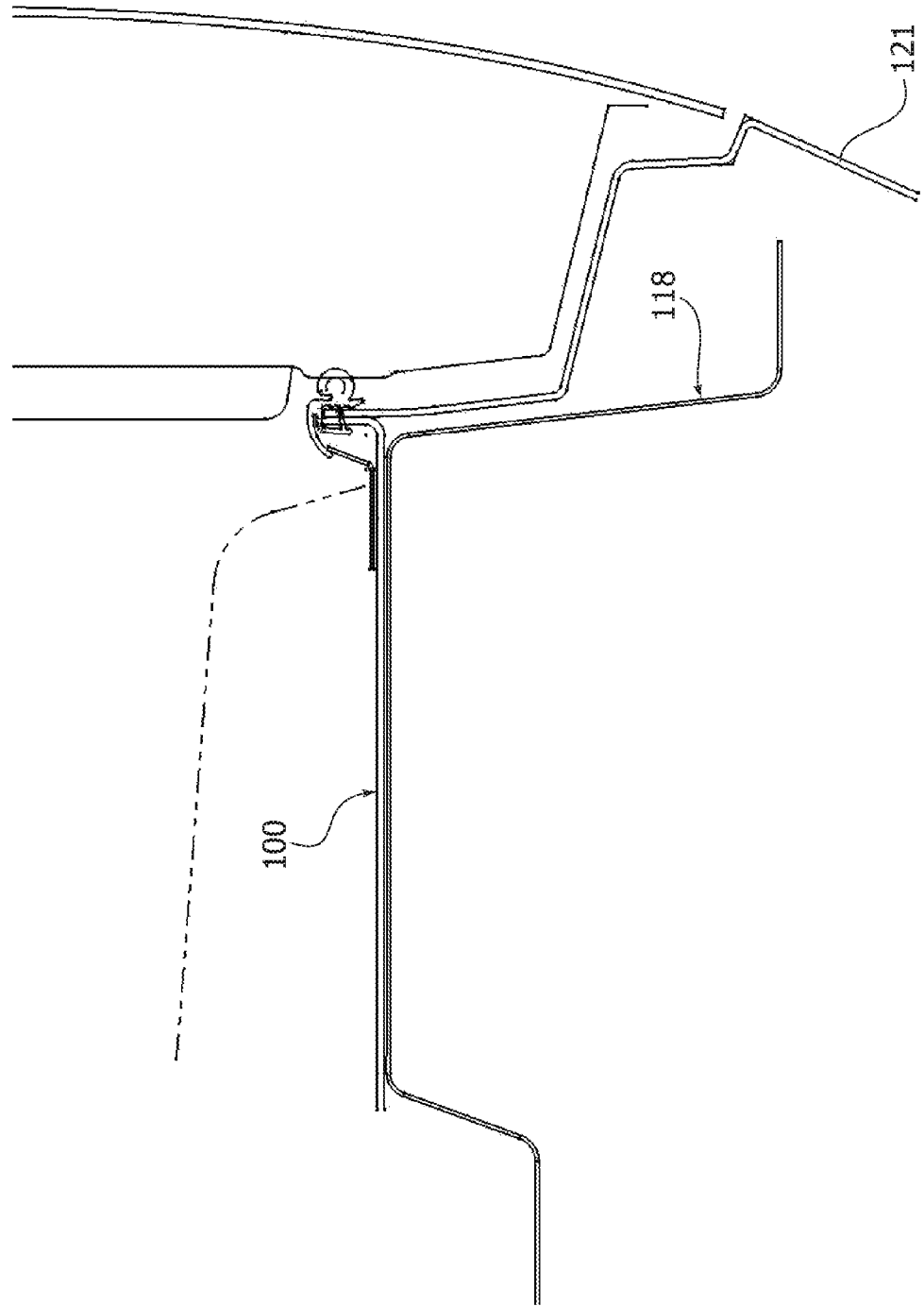

MOTOR-VEHICLE FRAME

BACKGROUND OF THE INVENTION

1. Field of the Invention

The present invention regards a motor-vehicle frame, of the type comprising:
- a pair of longitudinal members;
- a plurality of cross members that join said longitudinal members to one another;
- a resting surface, which is supported by said longitudinal members and cross members and defines the surface of the floor of the passenger compartment of said motor vehicle;
- a pair of front uprights; and
- a front-seat assembly.

2. Present State of the Art

In the sector of small- and medium-sized motor vehicles, there is the constant need, on the one hand, to build motor vehicles constituted by simple and low-cost structures, and, on the other, to guarantee in any case that these structures are resistant to impact and hence safe, and moreover that, even though they have small overall dimensions, they define inside them a passenger compartment that is relatively spacious and comfortable for the passengers.

SUMMARY OF THE INVENTION

In this context, the object of the present invention is to provide a vehicle frame that will meet the aforesaid needs, in particular for small-sized motor vehicles, such as for example motor vehicles belonging to the so-called "city car" segment.

The above object is achieved via a motor-vehicle frame having the characteristics indicated in the claims.

The claims form an integral part of the technical teaching provided in relation to the invention.

BRIEF DESCRIPTION OF THE DRAWINGS

Further characteristics and advantages of the invention will emerge clearly from the ensuing description with reference to the annexed drawings, which are provided purely by way of non-limiting example and in which:

FIGS. 5a, 5b, 5c are respective perspective views of the various components that constitute the portion of FIG. 3;

FIG. 13 is a cross-sectional view, according to a transverse vertical plane, of a detail of the structure of FIG. 12, from which it may be seen how a portion of the frame described herein is coupled to the aforesaid metal sheet.

DETAILED DESCRIPTION OF THE PREFERRED EMBODIMENTS

Illustrated in the ensuing description are various specific details aimed at providing an in-depth understanding of the embodiments. The embodiments may be provided without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

Figure 1:
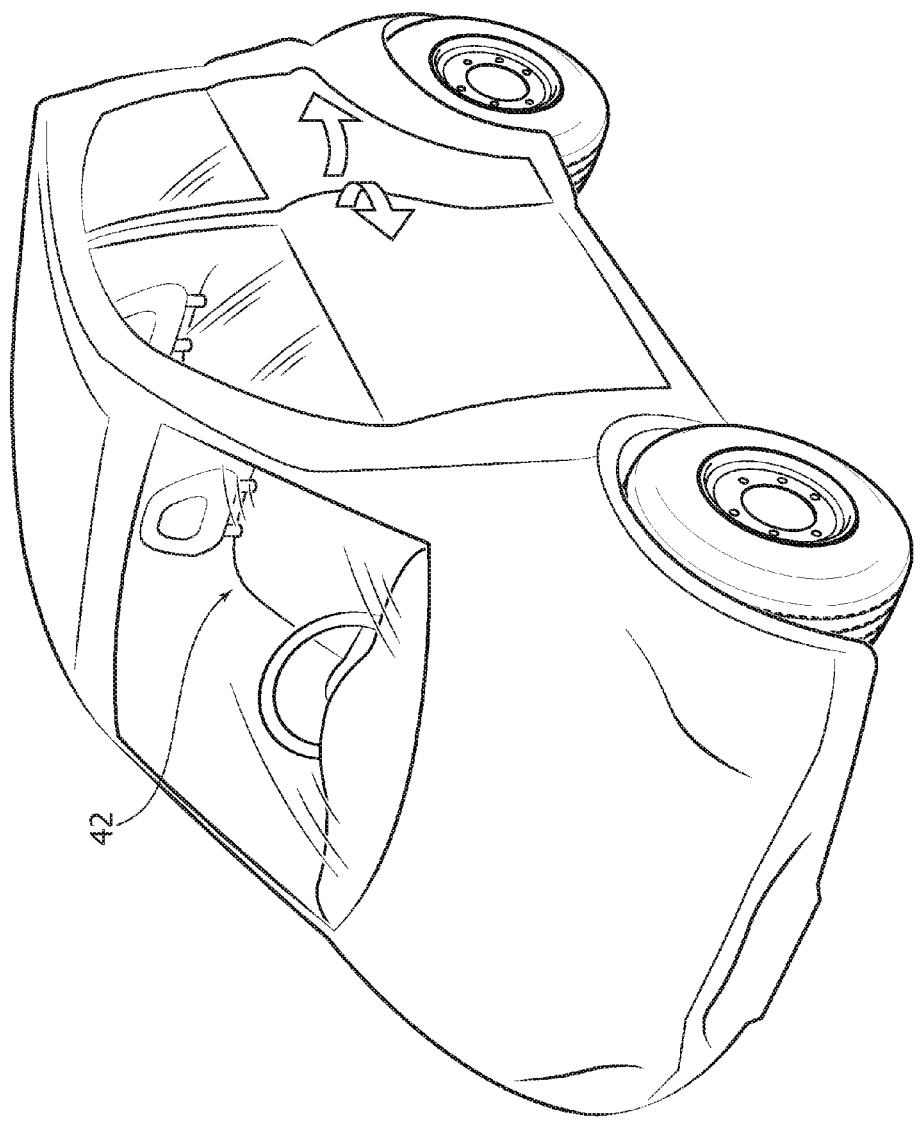
FIG. 1 represents an example of motor vehicle comprising the frame described herein.
Figure 2:
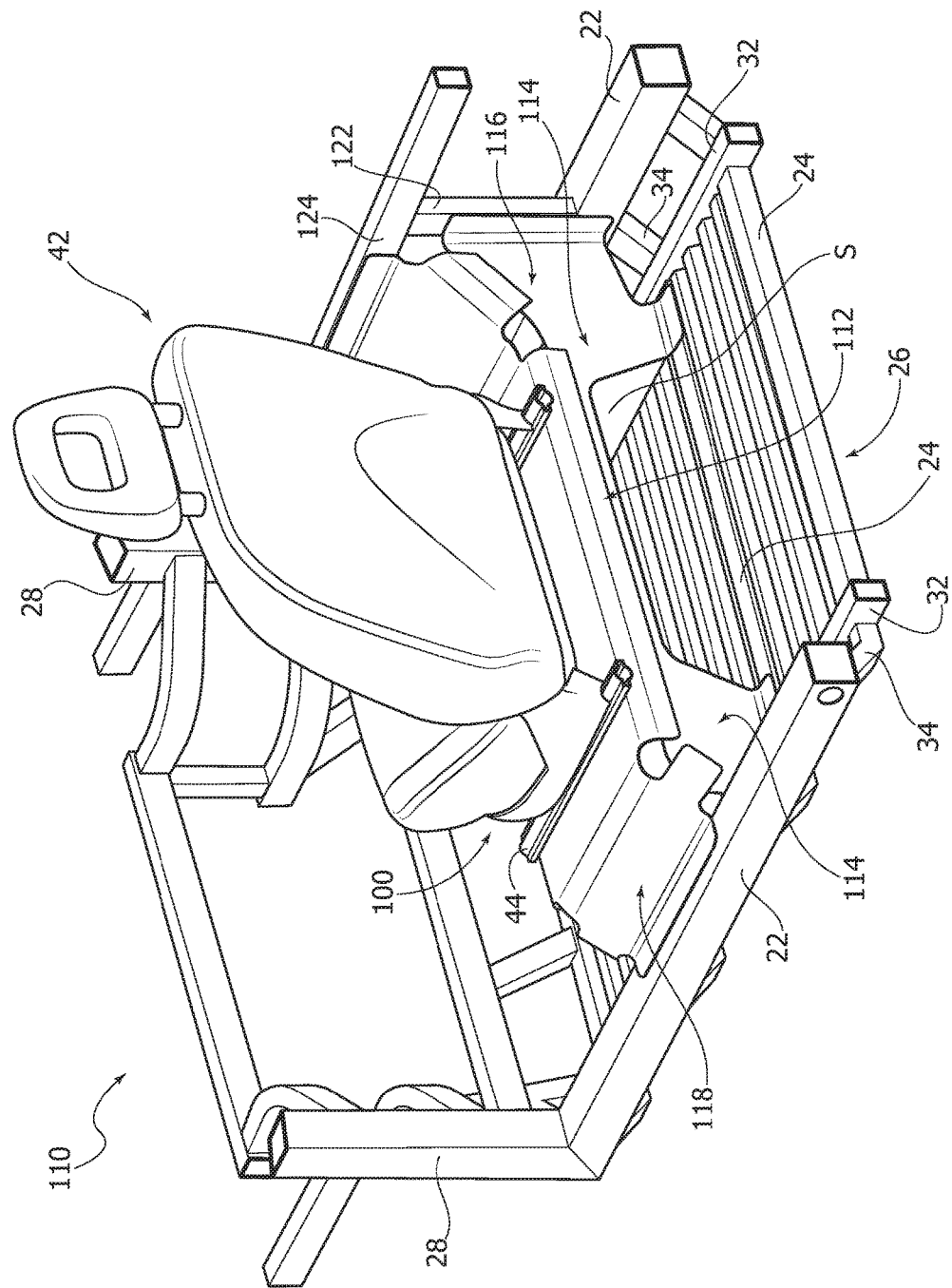
FIG. 2 is a perspective view of a first embodiment of the frame described herein.
Figure 3:
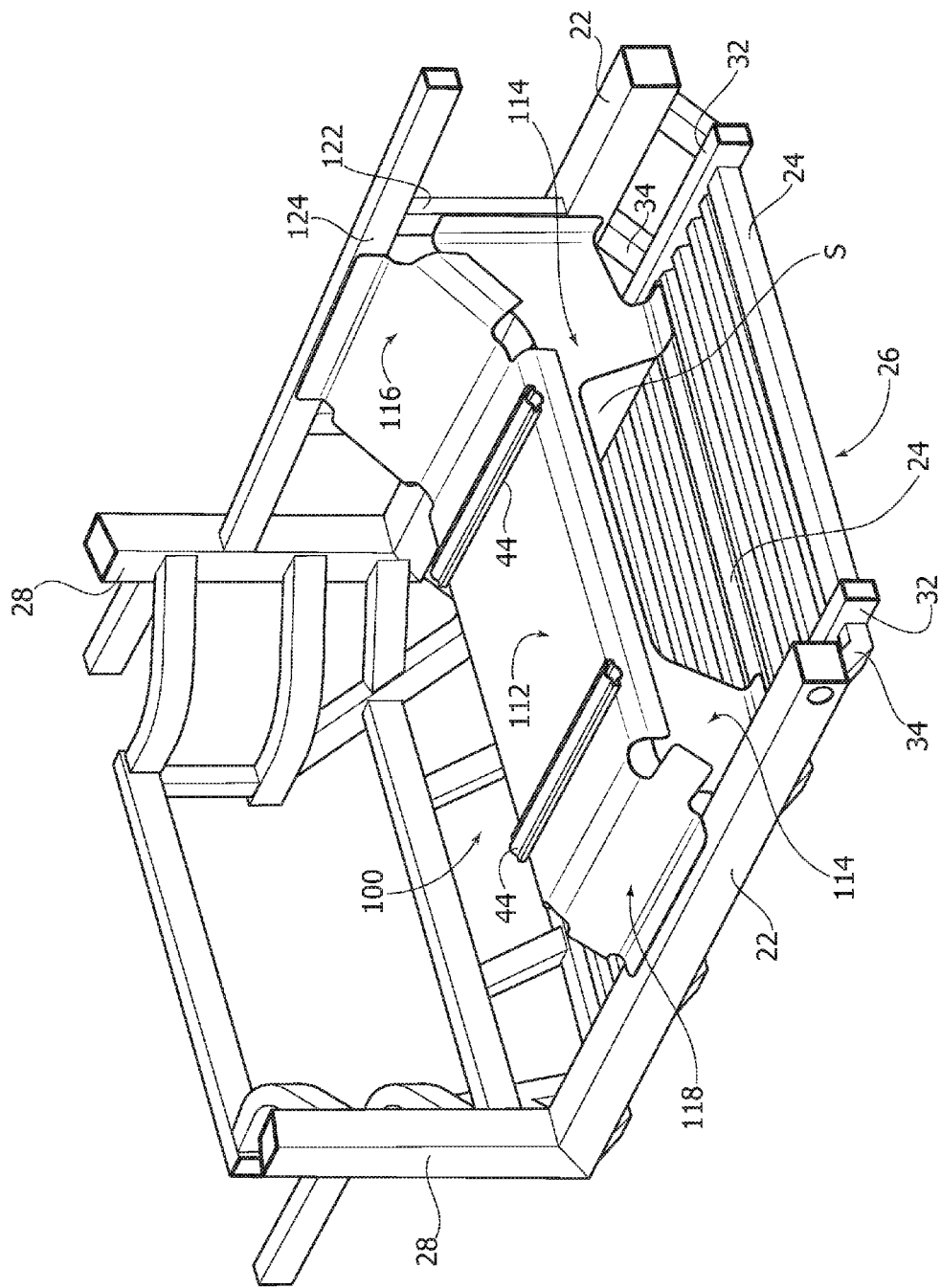
FIG. 3 is a perspective view from the back of a portion of the frame of FIG. 2.
Figure 4:
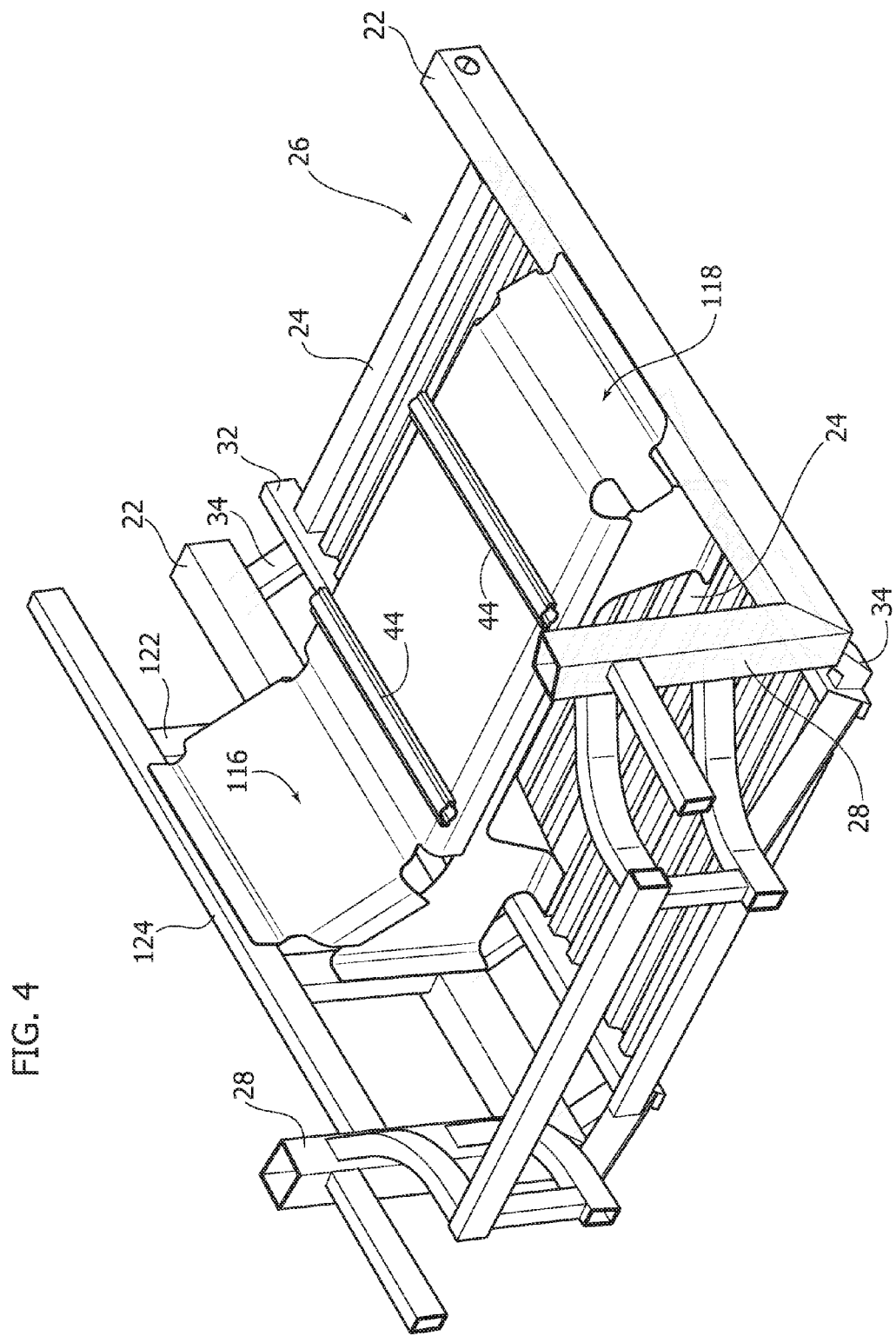
FIG. 4 is a perspective view from the front of the portion of FIG. 4.
Figure 5A:
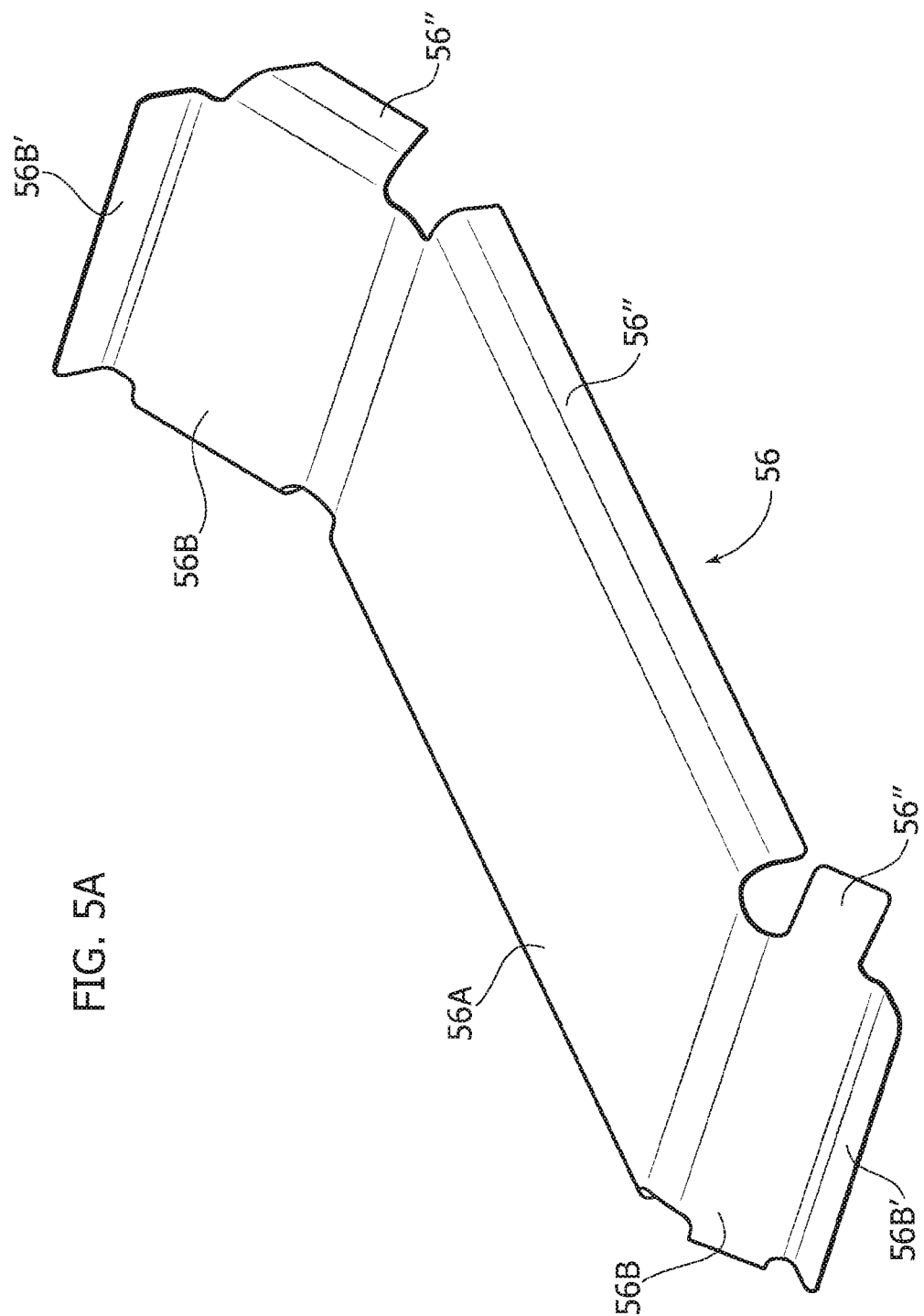
Figure 6:
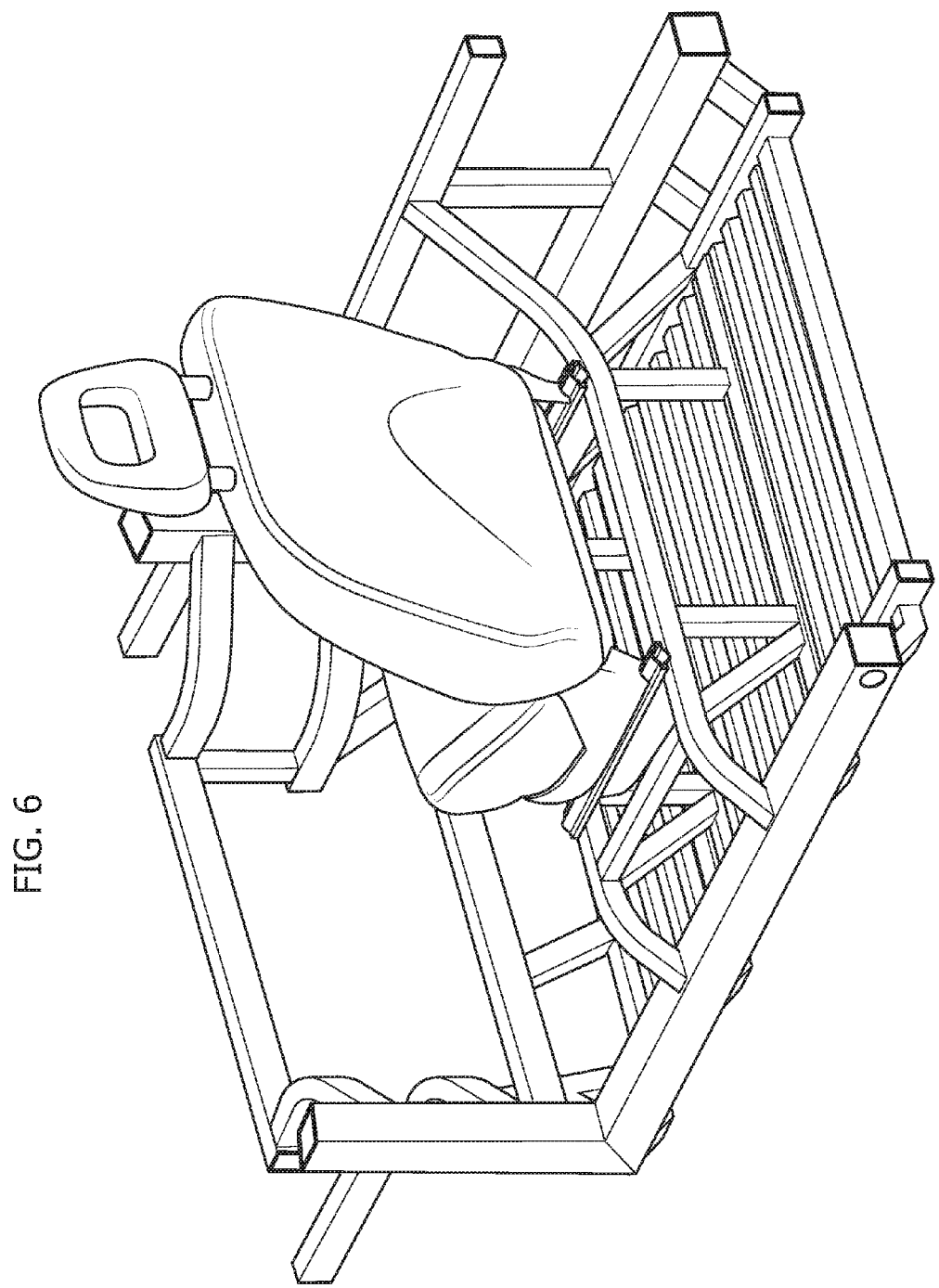
FIG. 6 is a perspective view from the back of a second embodiment of the frame described herein.
Figure 7:
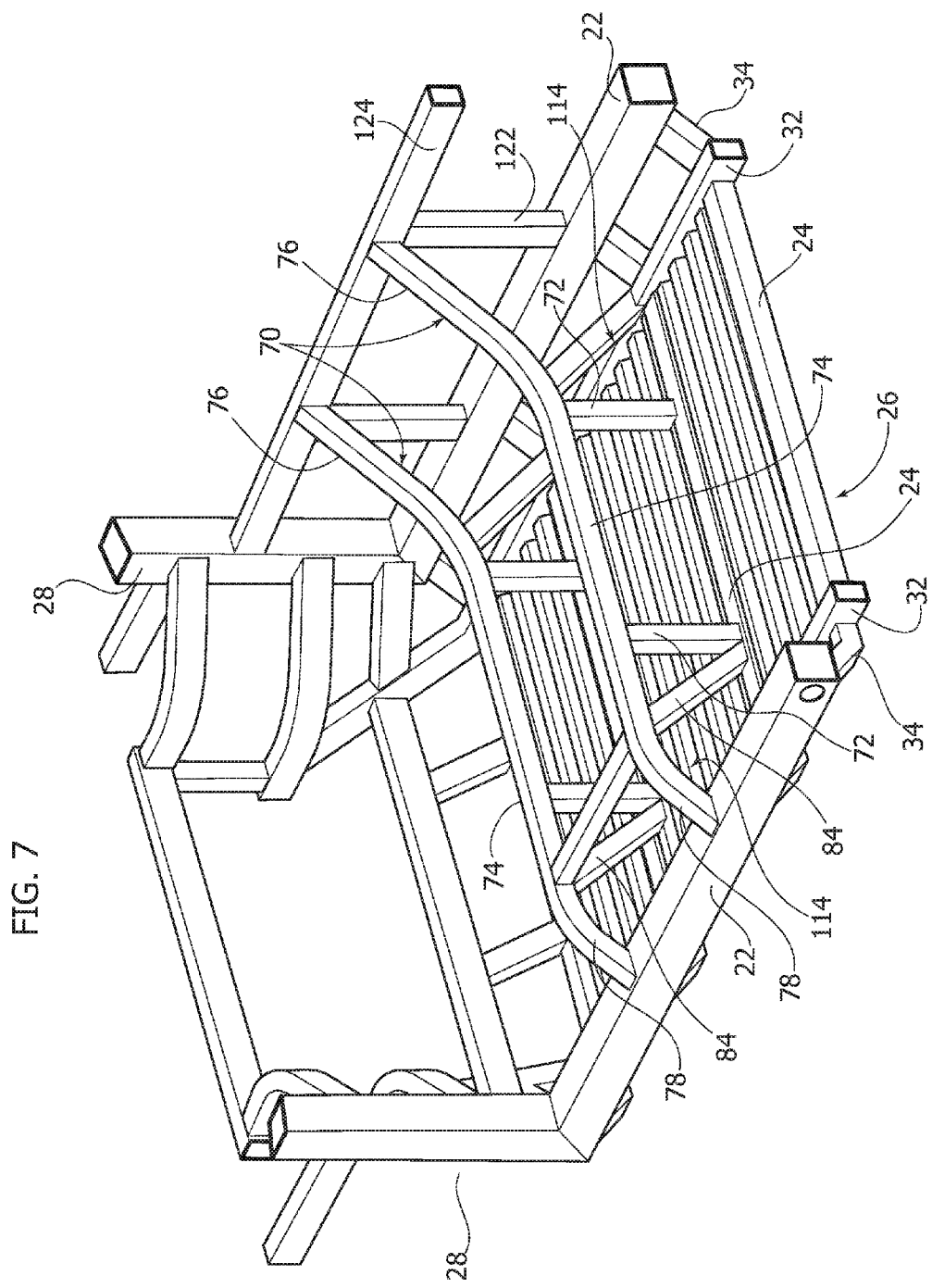
FIG. 7 is a perspective view from the back of a particular portion of the frame of FIG. 6.
Figure 8:
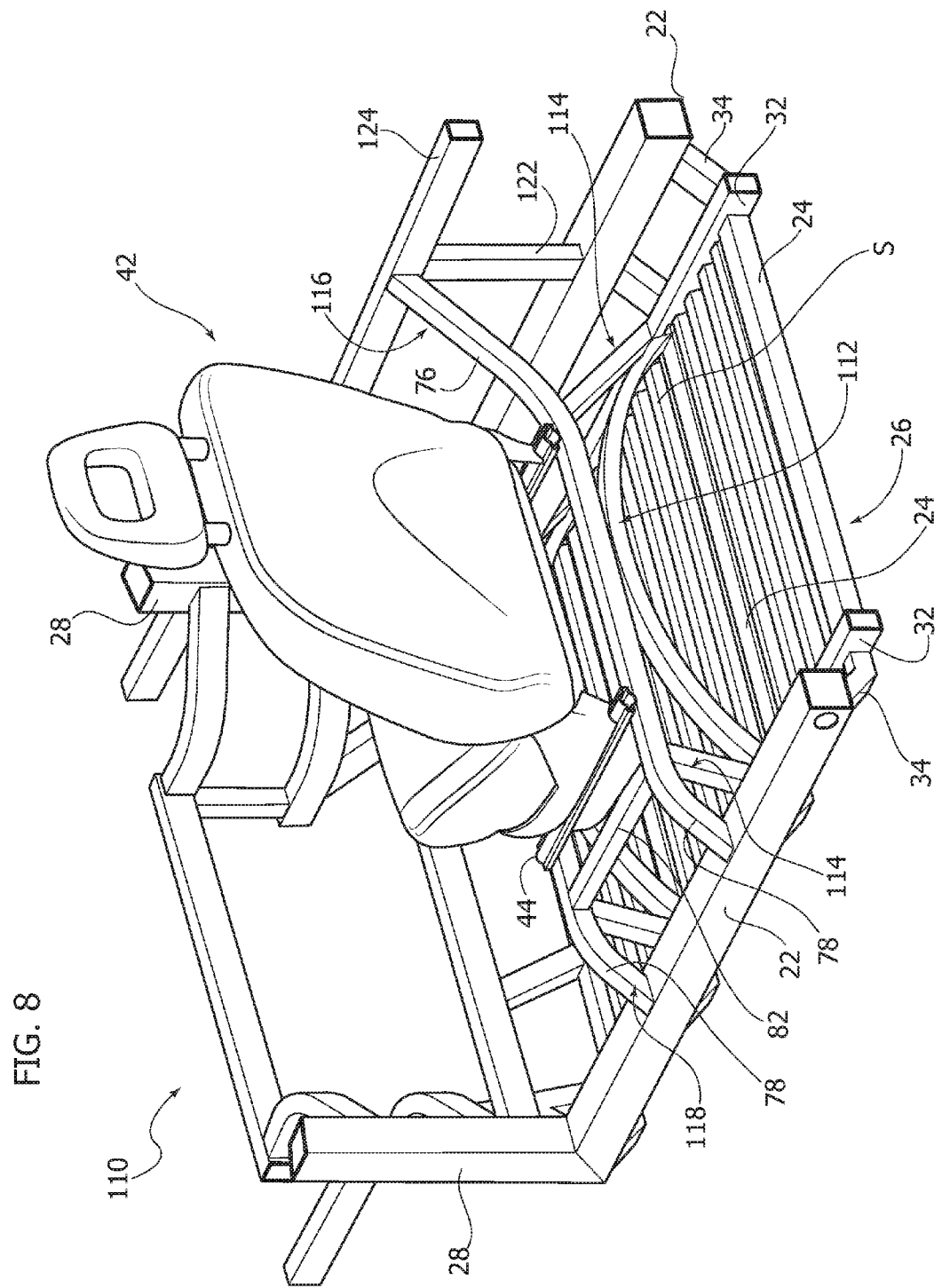
FIG. 8 is a perspective view from the back of a third embodiment of the frame described herein.
Figure 9:
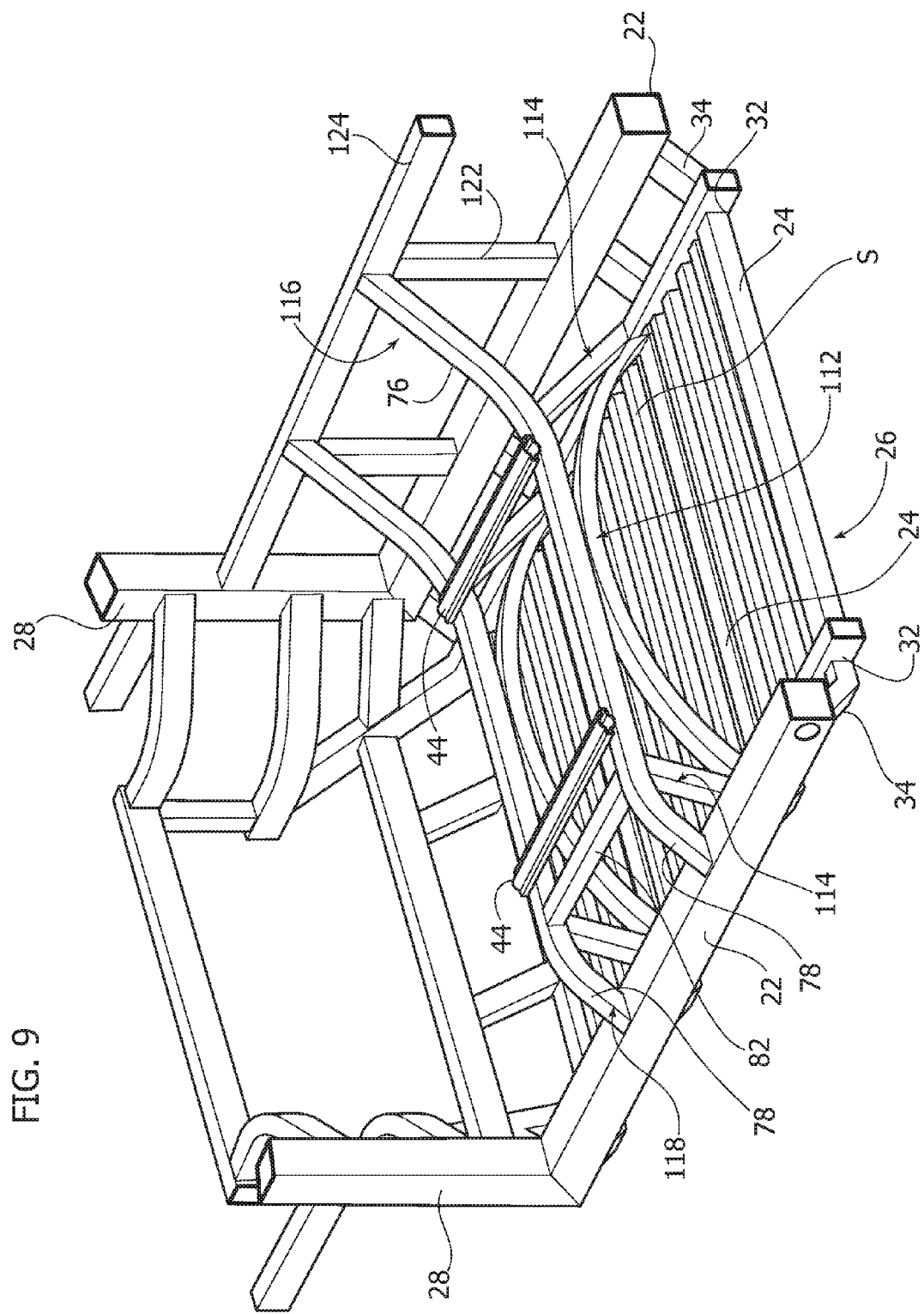
FIG. 9 is a perspective view from the back of a particular portion of the frame of FIG. 8.
Figure 10:
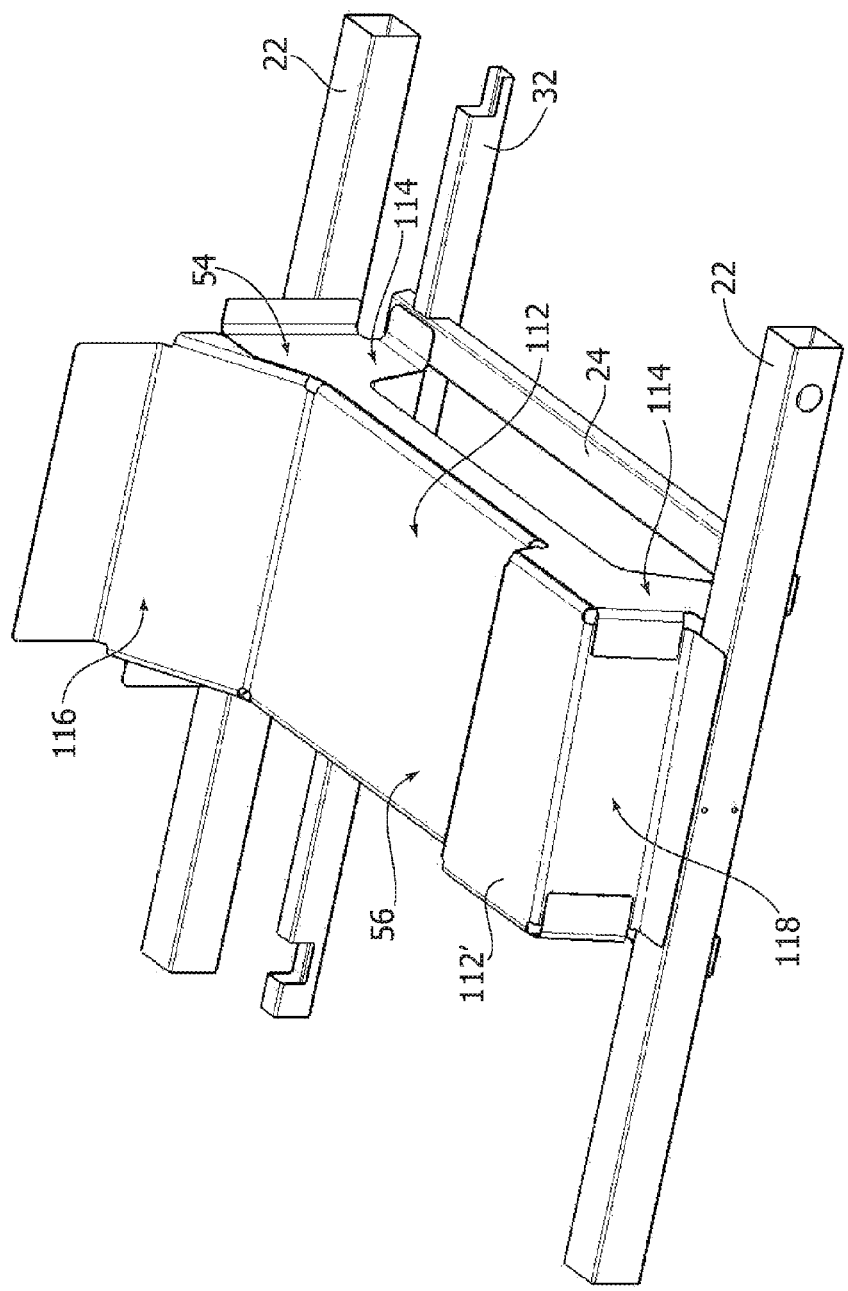
FIG. 10 is a perspective view from the back of a fourth embodiment of the frame described herein.
Figure 11:
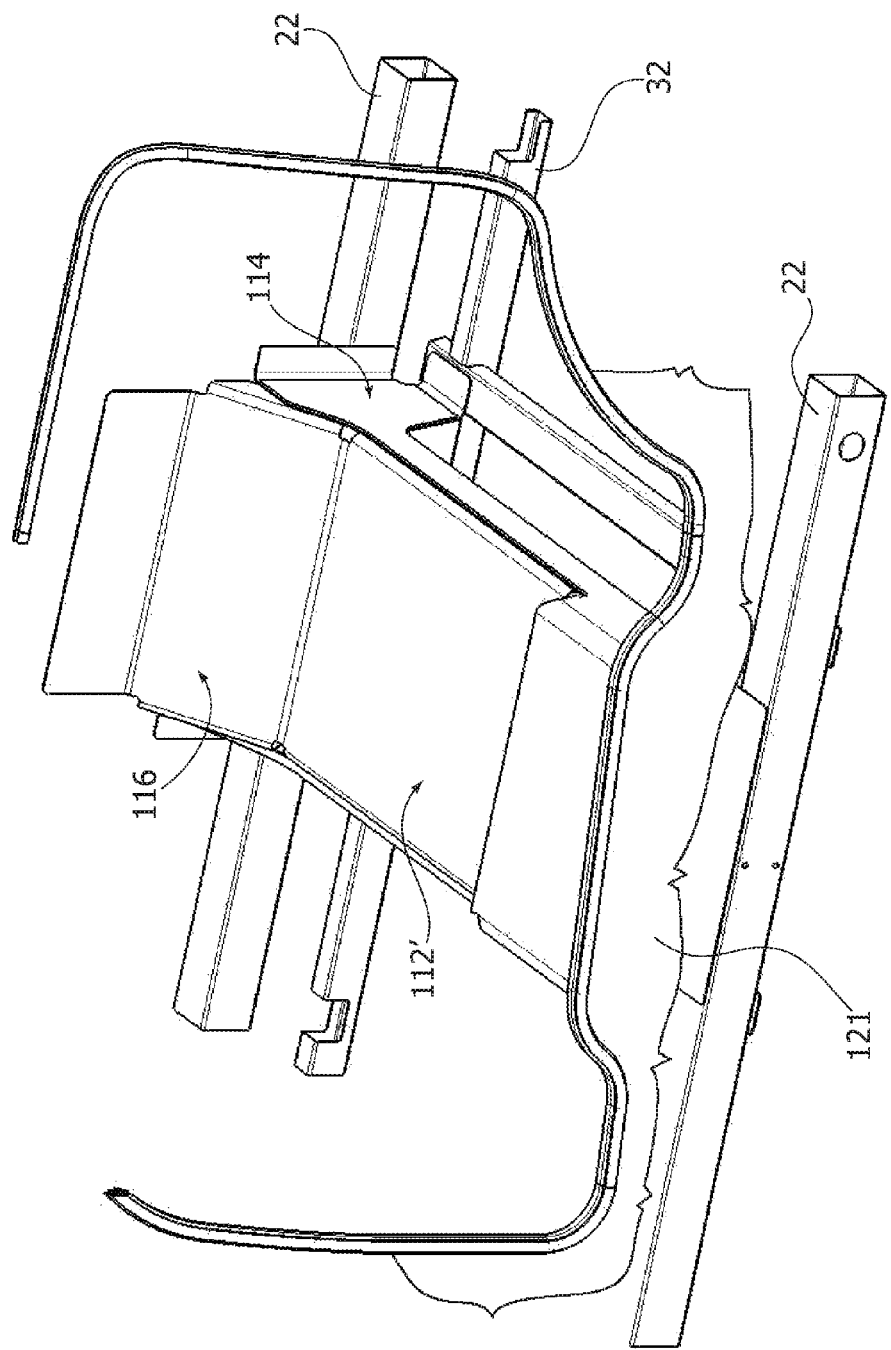
FIG. 11 is a schematic perspective view of the frame of FIG. 10, coupled to the metal sheet of the bodywork of the motor vehicle that defines at least part of the door compartment, taken from a viewpoint outside the motor vehicle.
Figure 12:
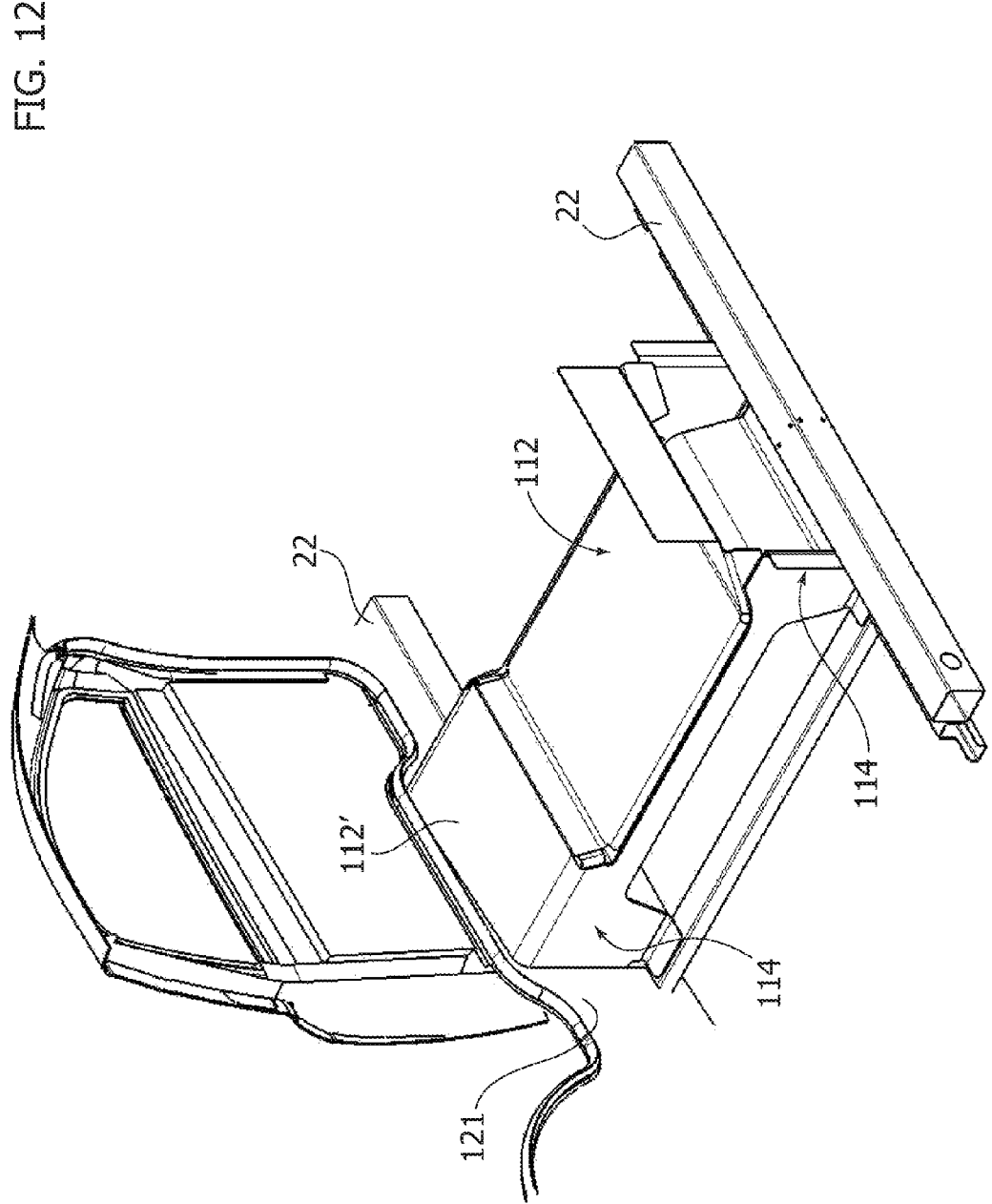
FIG. 12 is a schematic perspective view of the frame of FIG. 10, coupled to the metal sheet of the bodywork of the motor vehicle that defines at least part of the door compartment, which is taken from a viewpoint within the motor vehicle and in which the door is mounted on said metal sheet or panel.

Illustrated in FIG. 1 is an example of motor vehicle comprising the frame described herein. The motor vehicle illustrated belongs to the so-called "city car" segment and is characterized in that it envisages a single front-seat assembly for the driver, set centrally, and a rear-seat assembly for two passengers. This motor vehicle moreover envisages a single door, on one of the two sides (the left as viewed in the figure), of the double-leaf type.

The motor vehicle illustrated clearly constitutes just one example, and the frame described herein may obviously also be used on motor vehicles of a different type, for example with doors on both sides and two front seats. In any case, use of the frame described herein on motor vehicles of the type illustrated is particularly advantageous, as will be seen in what follows.

FIGS. 2 to 9 illustrate three different embodiments of the frame described herein. With reference to the above figures, it should be noted that they clearly do not illustrate the complete structure of the motor vehicle, but only a part thereof reproducing the innovative characteristics of the frame described herein, as compared to the frames of a conventional type used in the technical sector in question.

In general, the frame described herein, designated as a whole by the reference 110, comprises:
- a pair of longitudinal members 22;
- a plurality of cross members 24 that join said longitudinal members to one another;
- a resting surface 26, which is supported by said longitudinal members and cross members and defines the surface of the floor of the passenger compartment of said motor vehicle; and
- a pair of front uprights 28.

In various embodiments, as in the one illustrated, the frame moreover comprises a pair of further longitudinal elements 32, which are set on the same level as, or else underneath, the two longitudinal members, and are joined to one another by the same cross members as those with which the longitudinal members themselves are connected to one another. In various embodiments, as in the one illustrated, the two elements 32 are located in a plane underlying that of the two longitudinal members and are connected to the latter via a series of supports 34, which are contained in the same transverse planes as those in which the cross members are located, and are inclined with respect to the resting surface 26 by an angle greater than 90°. In the case illustrated, the resting surface 26 is identified by the longitudinal elements 32 and by the cross members 24.

The frame described herein is characterized in that it envisages, in its front portion identifying the region of the passenger compartment where the driver's seat is located, a platform structure 100. The platform structure 100 has a portion 112 raised with respect to the resting surface, and two opposite foot formations 114, which support the aforesaid raised portion, resting on the cross members 24, which are located in the aforesaid front region, and/or on the longitudinal members 22, and/or on the additional longitudinal elements 32. In various preferred embodiments, as in the one illustrated, the raised portion 112 extends at least in a central region of the passenger compartment, with respect to the transverse dimension of the latter. The front-seat assembly is mounted on the portion 112. In particular, as may be seen in the figures, mounted on the portion are a pair of guides 44, in turn mounted on which is the seat 42 in such a way that it can be adjusted in position along the guides themselves. The structure 100 is configured in such a way as to determine, underneath the raised portion 112, between the two foot formations 114, a space S suited to receiving the feet of the passengers accommodated on the rear seat of the motor vehicle.

In various embodiments, as in the one illustrated, the frame 110 moreover comprises an additional protection module, which is located, on the motor vehicle illustrated in the figure, on the side without door (i.e., the right side with reference to the example illustrated). This protection module comprises an upright 122, carried by one of the longitudinal members 22, and a longitudinal element 124, which is set on top of the aforesaid longitudinal member and joins the upright 124 to the corresponding front upright 28.

The platform structure 100 comprises a lateral support 116 that joins the raised portion 112 and the additional longitudinal element 122. In various preferred embodiments, as in the one illustrated, with respect to a horizontal surface, the aforesaid lateral support extends, for joining the raised portion 112 to the element 122, in a direction inclined upwards, so as to constitute a sort of "shoulder" for containing and discharging on the resting surface of the vehicle the lateral thrusts acting on the side. In general, the lateral support in question has the function of opposing any possible impact exerted on the side of the vehicle in the case of accident that might cause the side to cave in.

In various preferred embodiments, as in the one illustrated, the raised portion 112 is moreover connected to the longitudinal member opposite to the one on which the additional protection module is provided, via a lateral support 118 of a type similar to the support 116. In this case, the support 118 extends, for joining the raised portion 112 to the corresponding longitudinal member 22, in a direction inclined downwards.

In the light of the foregoing, it is evident how the platform structure 100 is able to afford a greater comfort within the passenger compartment thanks to the space S obtained thereby, and, moreover, how it is at the same time able to strengthen the overall structure of the motor vehicle, rendering it safer.

FIGS. 2 to 9 illustrate three different embodiments of the structure in question. In particular FIGS. 2 to 5 illustrate an embodiment in which the aforesaid structure is made up of bent metal sheets, whereas FIGS. 6 to 9 illustrate two different embodiments in which the structure is constituted by tubular elements.

With reference now to the first embodiment illustrated in FIGS. 2 to 5, the structure 100 comprises a first metal sheet 52, which is bent substantially to form an arch and is oriented so as to define a substantially horizontal raised surface 52A. This structure moreover comprises two vertical or in any case transverse metal sheets 54, which are coupled to the opposite edges of the metal sheet 52 and are cut out in a central region thereof so as to reproduce the arched profile defined by the bent metal sheet 52. The metal sheets 54 moreover have a series of horizontal and/or vertical bent flaps 54' for fixing the structure to the frame. Finally, the structure comprises a top metal sheet 56 bent so as to define a substantially horizontal central portion 56A, which constitutes the raised portion 112 on which the seat assembly is directly fixed, and two inclined lateral portions 56B, which are designed to define the lateral supports 116 and 118 referred to above. The central portion 56A and the lateral portions 56B have curved edges 56" oriented downwards, which are to rest on the top edges of the two plates 54. Finally, the lateral portions 56B have a respective end flap 56B' via which these portions can be fixed, respectively, to the longitudinal member 22 close to the lateral support 128 and to the longitudinal element 124.

The embodiment illustrated in FIGS. 10 to 13 has a structure altogether similar to the one just described with reference to FIGS. 2 to 5. It differs in that the raised portion 112 has a step part defining a surface 112' that is located at a height greater than the central region of the raised portion and in a lateral position up against the lateral support 118, the latter consequently having a vertical extension greater than that of the support 118 of the embodiment of FIGS. 2 to 5. As may be seen from FIGS. 10 to 13, in the embodiment in question the metal sheet 56 and the plates 54 are hence shaped so as to identify, in addition to the parts in common with the structure 100 of the embodiment of FIGS. 2 to 5, also the surface 112'.

With reference to the embodiments illustrated in FIGS. 6 to 9, the structure 100 instead comprises, in this case, two plane modules 70, set parallel, each of which is formed by tubular portions and has at least two pillars 72, which rest either on a respective cross member 24 of the frame (as in the embodiment of FIGS. 6 and 7) or else on the additional longitudinal element 32 (as in the embodiment of FIGS. 8 and 9), and a horizontal element 74 supported by the pillars 72, which connects up to the additional longitudinal element 122, via an extension 76 inclined upwards, and to the longitudinal member 22, via an extension 78 inclined downwards. This structure moreover comprises at least one cross member 82 that connects the horizontal elements 74 of the two modules together. The elements 74 define the raised portion 112 of the structure, the pillars 72 define the foot formations 114, whilst the inclined extensions 76 and 78 define the lateral supports 116, 118. In various embodiments, as in the one illustrated, each module 70 may moreover comprise additional supporting elements, such as, for example, the inclined elements 84 illustrated in FIGS. 6 and 7, which have the function of withstanding any possible lateral thrust on the module, or else the arched element 86 illustrated in FIGS. 8 and 9, set between the two pillars 72 and underlying the horizontal element 74.

In various embodiments, as in the ones illustrated, the platform structure 100 also has the function of constituting a structure for supporting the door of the motor vehicle. In particular, as may be seen in the example of FIGS. 11, 12, and 13, the metal sheet of the motor vehicle designated by the reference 121, which defines at least part of the door compartment, is coupled to the structure 100 at its lateral support 118, which hence acts as upright designed to withstand the lateral loads acting against the door. In the example of motor vehicle of FIG. 1, the structure 100 acts for supporting laterally both of the leaves of the double-leaf door with which the vehicle illustrated is equipped. Even though FIGS. 11, 12, and 13 regard specifically the embodiment of FIG. 10, the same function of support for the door is clearly performed also by the structures 100 of the other embodiments illustrated herein.

Of course, without prejudice to the principle of the invention, the details of construction and the embodiments may vary, even significantly, with respect to what has been illustrated purely by way of non-limiting example herein, without thereby departing from the scope of the invention, as defined by the annexed claims.

The invention claimed is:

1. A motor-vehicle frame, comprising:
    a pair of longitudinal members comprising a first longitudinal member and a spaced apart second longitudinal member;
    a plurality of cross members that extend between and join said longitudinal members to one another, said pair of longitudinal members and said plurality of cross members forming a resting surface that defines a surface of a floor;
    a front-seat assembly disposed above said resting surface;
    a pair of upwardly extending front uprights disposed forward of said front-seat assembly; and
    a platform structure comprising:
        a raised portion raised above said resting surface, said front-seat assembly being mounted on said raised portion, and
        two opposite foot formations that support said raised portion and that rest on said resting surface or on at least one of said longitudinal members, a space being formed below said raised portion and between said foot formations;
    at least one additional upright upwardly projecting from said first longitudinal member of said pair of longitudinal members;
    a longitudinal element that is disposed at an elevation above said raised portion and that extends from said at least one additional upright to one upright of said pair of front uprights; and
    said platform structure further comprising at least one lateral support that upwardly extends from said raised portion to said longitudinal element.

2. The frame according to claim 1, wherein said platform structure comprises a further lateral support that connects said raised portion to said second longitudinal member of said pair of longitudinal members.

3. The frame according to claim 2, wherein said further lateral support extends, for joining said raised portion to said second longitudinal member of said pair of longitudinal members, in a direction inclined downwards, towards said second longitudinal member.

4. The frame according to claim 1, comprising a pair of further longitudinal elements that are set on the same level as or are below said pair of longitudinal members and are joined to one another by said cross members.

5. The frame according to claim 1, wherein said platform structure is constituted by bent metal sheets or else by tubular modules.

6. The frame according to claim 1, wherein said platform structure comprises:
    a first metal sheet, which is bent substantially to form an arch and is oriented so as to define a substantially horizontal raised surface;
    two transverse metal sheets, which are coupled to the opposite edges of said first metal sheet and are cut out in a central region thereof so as to reproduce the arched profile defined by said first metal sheet; and
    a top metal sheet bent so as to define a substantially horizontal central portion, which constitutes said raised portion, and two inclined lateral portions, which are designed to define said lateral supports.

7. The frame according to claim 1, wherein said structure comprises two parallel plane modules, each of which is formed by tubular portions and has at least two pillars and a horizontal element supported by said pillars, the latter connecting up to said additional longitudinal element set on top of said one longitudinal member, via an extension inclined upwards, and to said other longitudinal member via an extension inclined downwards, wherein said pillars of said modules define said foot formations, said horizontal element defines said raised portion, and said extensions define said lateral supports, and wherein said structure moreover comprises at least one cross member that connects said modules together.

8. The frame according to claim 1, wherein said platform structure is configured for performing a function of support for the door of said motor vehicle.

9. The frame according to claim 8, wherein said structure comprises a further lateral support, configured for constituting an upright designed to withstand the lateral loads acting against said door.

10. The frame according to claim 1, wherein said longitudinal element is disposed at an elevation below an upper end of said front-seat assembly.

11. The frame according to claim 1, wherein said longitudinal element connects with said at least one additional upright at an elevation above said raised portion.

12. The frame according to claim 1, wherein said longitudinal element connects with said one upright of said pair of front uprights at an elevation above said raised portion.

13. The frame according to claim 1, wherein said first longitudinal member and said second longitudinal member each have a first end and an opposing second end, the raised portion being disposed between said first end and said second end of said first longitudinal member and said second longitudinal member.

14. The frame according to claim 1, further comprising a rear-seat assembly disposed behind the front-seat assembly.

* * * * *